United States Patent [19]

Yasuike et al.

[11] 4,129,635
[45] Dec. 12, 1978

[54] METHOD FOR PRODUCING FOAMED MOLDINGS FROM SYNTHETIC RESIN MATERIALS

[75] Inventors: Akio Yasuike, Yokohama; Hiroshi Kataoka, Tokyo; Kaoru Toyouchi, Yokohama, all of Japan

[73] Assignee: Asahi-Dow Limited, Tokyo, Japan

[21] Appl. No.: 814,127

[22] Filed: Jul. 8, 1977

Related U.S. Application Data

[63] Continuation of Ser. No. 534,134, Dec. 18, 1974, abandoned.

[30] Foreign Application Priority Data

Dec. 28, 1973 [JP] Japan .................................. 48-1245

[51] Int. Cl.$^2$ .............................................. B29D 27/00
[52] U.S. Cl. ........................................ 264/45.5; 264/51; 264/529; 264/328; 264/DIG. 14; 264/DIG. 83
[58] Field of Search ..................... 264/245, 328, 45.5, 264/45.1, 48, DIG. 14, DIG. 83, 51, 94

[56] References Cited

U.S. PATENT DOCUMENTS

| | | | |
|---|---|---|---|
| 3,058,161 | 10/1962 | Beyer | 264/45.5 |
| 3,211,605 | 10/1965 | Spaak | 161/43 |
| 3,378,612 | 4/1968 | Dietz | 264/45 |
| 3,558,751 | 1/1971 | Santelli | 264/97 |
| 3,901,958 | 8/1975 | Doll | 264/45.5 |
| 4,033,710 | 7/1977 | Hanning | 425/543 |

FOREIGN PATENT DOCUMENTS

| | | | |
|---|---|---|---|
| 852609 | 8/1952 | Fed. Rep. of Germany | 425/DIG. 206 |
| 1929343 | 12/1970 | Fed. Rep. of Germany | 425/4 R |
| 2106546 | 8/1972 | Fed. Rep. of Germany | 264/DIG. 83 |

*Primary Examiner*—Philip Anderson
*Attorney, Agent, or Firm*—Cushman, Darby & Cushman

[57] ABSTRACT

Foamable synthetic resin materials are plastified and injected into a mold cavity in an amount less than the volume of mold cavity and a body of gas under pressure is charged in the mold cavity in such manner that it is enclosed by said resin materials. When the injected resin materials sets at least at its outer surface layer, the gas is discharged out of the mold cavity so that the foamable resin materials can be expanded in the hollow portion formed by the pressure of the charged gas. Said foamable resin materials may be surrounded by unfoamable resin materials in the mold cavity.

2 Claims, 11 Drawing Figures

METHOD FOR PRODUCING FOAMED MOLDINGS FROM SYNTHETIC RESIN MATERIALS

This is a continuation, of application Ser. No. 534,134 filed Dec. 18, 1974, now abandoned.

The present invention relates to method for producing foamed article from synthetic resin materials.

In the conventional injection molding, molten foamable resin material must be subjected, in a high temperature region within a cylinder of an injection molding machine, to a pressure which is capable of inhibiting the expansion of resin materials derived from the action of a foaming agent. The foamable resin materials must also be foamed and expanded at the time when they are injected into the mold cavity out of the molding machine and released from said pressure. The injection of the foamable resin materials under such conditions as mentioned above has chiefly been carried out in either of two processes which are in general called the short-shot process and the full-shot process, respectively.

The short-shot process includes the step of injecting foamable resin materials into a mold cavity in an amount less than the volume thereof. In a subsequent step, the resin materials expand in the mold cavity only by the foaming action itself. Such foaming action begins to fall off rapidly once the expansion of the resin materials is initiated in the mold cavity. When a mold cavity smaller in thickness is used, it cannot be sufficiently filled with the resin materials which have expanded therein. In this case, the injection temperature is required to be elevated as far as possible in order to lower the viscosity of the resin materials. Accordingly, the short-shot process is not applicable to resin materials which are liable to be thermally decomposed.

It is well known to those skilled in the art that in order to obtain excellent foamed articles from foamable resin materials or to attain a high foaming ratio of resin materials, it is necessary to control the resin materials to have a proper viscosity, i.e., a relatively low temperature close to the softening point of the resin materials used. In such short-shot process, the maximum foaming ratio may be at most 1.6 to 1.8 and yet the resultant foamed articles are inferior in physical properties.

Further, when the expansion of the resin materials only relies upon the foaming action itself, it is customary to strengthen the foaming action by increasing the amount of stronger foaming agent to the resin materials. This addition of foaming agent, in connection with the adoption of such elevated temperature as mentioned above, requires longer residence time of the resultant foamed articles in the mold cavity so that it interferes with improvement of productivity.

A still further disadvantage of the short-shot process is that foamed articles with smooth surface are difficult to be obtained. Since the resin materials are expanded in the mold cavity only by the foaming action itself, the reproducibility with respect to the mold walls forming the mold cavity is unsatisfactory. Namely, although the foaming pressure of the resin materials depends upon molding conditions, it is generally 30 kg/cm$^2$ or less. Such foaming pressure is too low to force the resin materials against the surrounding walls of the mold cavity so as to obtain the resultant foamed articles with smooth surface layers.

In order to avoid these disadvantages of the short-shot process, the full-shot process has been developed. According to this full-shot process, thermoplastified foamable resin materials are injected into a mold cavity in a amount sufficient to fill the mold cavity and then released from the injection pressure to expand in the mold cavity. A method for releasing the foamable resin materials from the injection pressure is disclosed by U.S. Pat. No. 3,058,161. In this method, thermoplastified foamable resin materials are injected to fill a mold cavity which may be enlarged to the desired dimension in volume, and thereafter the mold cavity is enlarged to obtain the desired foamed articles.

U.S. Pat. Nos. 3,211,605 and 3,384,691 disclose other methods wherein thermoplastified foamable resin materials are full-shot into a mold cavity and then a part of the foamed resin materials is discharged out of the mold cavity to obtain the desired foamed articles.

According to the disclosed methods, the thermoplastified foamable resin materials are full-shot so that they will be charged in the mold cavity under the injection pressure other than the foaming action itself as a first step. Accordingly, the mold cavity can easily be filled with the resin materials even if it has a width as narrow as about 2 mm, in a manner similar to the injection of unfoamable resin materials.

The foaming ratio of resin materials varies depending on each of the properties and quantities of the foaming agents contained therein, but higher foaming ratios can be generally attained by increasing the viscosity of the resin materials. According to the methods disclosed in the above-mentioned U.S. Patents, the filling of high viscosity resin materials into the mold cavity can be accomplished by increasing the injection pressure. Further, no substantial foaming takes place within the short period of time during the injection so that the surfaces of the injected resin materials are made relatively smooth to form excellent foamed articles. Moreover, the mold cavity is enlarged in volume after the completion of injection or otherwise the period of time is controlled prior to the discharge of resin materials, whereby the unfoamed surface layers can be optionally controlled in thickness to a minimum of 0.3 mm although the values vary naturally depending upon the properties or foaming ratios of the resin materials used. A "structural foam" with an unfoamed surface layer which has excellent mechanical strength can be obtained according to the full-shot processes mentioned above.

However, these full-shot processes have various disadvantages in that mold assemblies are extremely complicated in construction and expensive since the mold cavities thereof are enlarged in volume after the resin materials are injected therein and in that the moldings have limited shapes for the same reasons above-mentioned. Such complicated and expensive mold assemblies resulted also from the discharge of the resin materials after the injection thereon. Moreover, the discharged resin materials require much time for recovery and reuse. In consideration of the quantity of the discharged materials other than the quantity required to obtain desired moldings, large-volume injection molding machines must be used.

"Modern Plastics" published in March, 1969 in the United States of America discloses a process for producing highly foamed articles having smooth surfaces wherein molten foamable resin materials are injected into a mold cavity pre-pressurized with a gas under pressure and simultaneously the gas is discharged out of the mold cavity so that it is filled with the resin materials; only the resin materials in contact with the surrounding walls of the mold cavity are solidified; the unsolidified internal portion of the resin materials is expanded by reducing the internal pressure of the injection molding machine; and the excess resin materials are returned to the injection molding machine.

Such process has disadvantages in that a major portion of the molten resin materials is returned to the injection molding machine so that a large-volume injection molding machine is required. This leads to higher costs for installation and also for the higher power required. The above-mentioned process has the further basic disadvantage in that the reversing of the resin materials into the injection molding machine is difficult because the internal pressure of the injection molding machine decreases causing the resin materials therein to expand when an injecting ram or screw is reversed. Therefore, the resultant moldings have lower foaming ratios. Moreover, the resin materials tend to effect deterioration of the moldings and the foams have uneven cells since the reversed resin materials have been employed again.

French Pat. No. 1,576,083 discloses a process for producing foamed articles characterized by the steps of injecting thermoplastified foamable resin materials into a mold cavity pre-pressurized with a gas under pressure, then removing the pressure of the gas and discharging a part of resin materials unsolidified in the mold cavity. In this process, however, a large-volume injection molding machine is required and yet it requires much time and labor to recover the discharged resin materials. In some cases, the discharged resin materials cannot be even recovered nor reused.

An object of the present invention is to provide a novel short-shot method for producing foamed moldings with smoother surface layers similar to that in the full-shot process.

In order that the invention may be clearly understood and readily carried into effect, embodiments thereof will be described by way of example with reference to the accompanying drawings, which:

Figure 1:
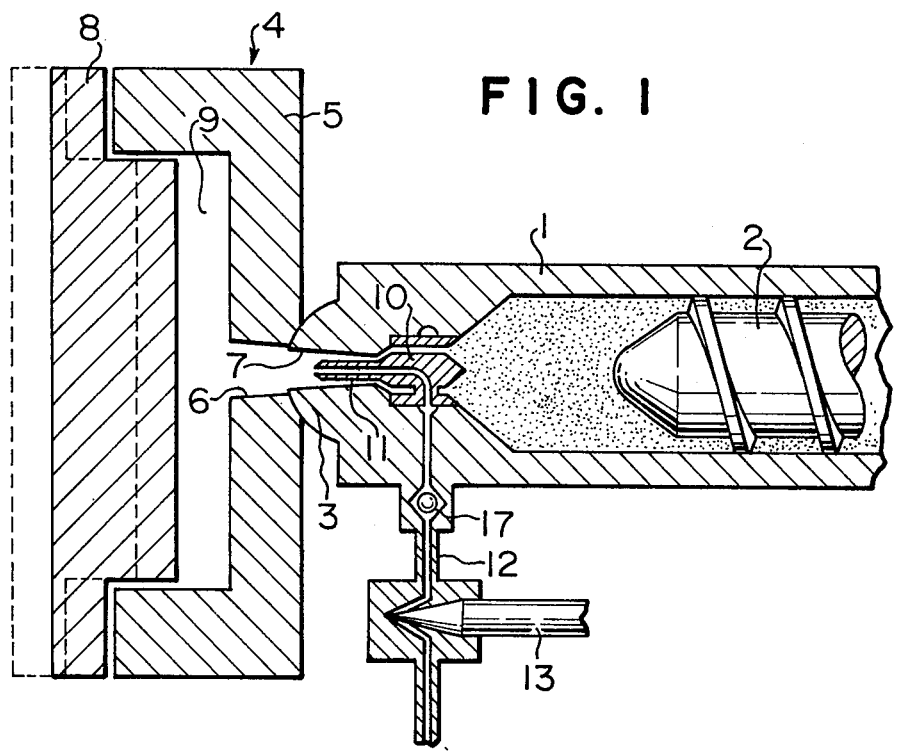
FIG. 1 is a sectional view showing an apparatus for carrying out the method of the present invention.

Referring to FIG. 1, an injecting cylinder 1 is shown to include an injecting screw 2 therewithin as in the conventional injection molding machines well known in the art. The injecting screw 2 is driven forwardly toward the nozzle portion 3 in the tip of the injecting cylinder 1 by means of any suitable driving mechanism.

A mold assembly 4 is provided with a stationary mold portion 5 having a sprue 6 connected with the injecting passage 7 of the nozzle portion 3. The stationary mold portion 5 is associated with a movable mold portion 8 which may be moved apart from or toward the stationary mold 5 by means of any suitable mechanism well known in the art.

Another object of the present invention is to provide a novel short-shot method for producing foamed moldings with smoother surfaces, wherein a conventional injection molding machine together with inexpensive and simple mold assembly can be used.

Other objects and advantages of the present invention will be apparent from the following description.

According to the present invention, there is provided a method for producing a foamed molding from synthetic resin materials, which comprises injecting thermoplastified foamable synthetic resin material into a mold cavity in an amount less than the volume of the mold cavity, charging a body of gas under pressure into said mold cavity in such manner that it is enclosed by said resin material and discharging the gas out of the mold cavity when said foamable resin material sets at least at its outer surface layer. The stationary and movable mold portions 5 and 8 form a mold cavity 9 therebetween which communicates with the injecting cylinder 1 through the sprue 6 and the passage 7 of the nozzle portion 3.

Within the injecting passage 7 of the nozzle portion 3 there is located a gas-charging device 10 which is provided with a charging nozzle 11 opening outwardly through the injecting passage 7. The charging nozzle 11 is connected with any source of pressurized gas through a check valve 17 and a passage 12 which may be opened or closed selectively by means of any suitable valve member such as a wedged member 13 shown in FIG. 1.

In operation, foamable resin materials are plastified by the injecting screw 2 in the cylinder 1 and then injected into the mold cavity 9 by the same screw in an amount less than the volume of mold cavity. Preferably, the mold cavity 9 is pre-pressurized with a gas such as air or gaseous nitrogen so as to prevent the expansion of the injected resin materials. For example, the gas under pressure is charged in the mold cavity through a vent (not shown) that permits the gas to pass through but not the resin materials.

After injection of the foamable resin materials, a body of gas under pressure is charged in the mold cavity 9 from the charging nozzle 11 of the gas-charging device 10 through the injecting passage 7 and the sprue 6. Since the gas is charged in such condition that it is enclosed by the resin material, a hollow portion is formed in the mass of the resin material. The gas is preferably preheated prior to the charge so as to prevent the resin material from cooling.

When the resin material sets at least at its outer surface layer, the gas charged from the gas-charging device 10 is discharged out of the hollow portion, for example, by separating the nozzle portion 3 of the injection molding machine from the mold assembly 4. However, the discharge of the gas may be effected by any suitable means. When the gas is discharged out of the mold cavity 9, the resin materials which do not set will expand in the hollow portion toward its center. The resultant moldings consist of unfoamed outer layers and foamed cores surrounded by said unfoamed layers. Preferably, the mold cavity 9 is connected to any source of vacuum through said vent when the gas is discharged out of the mold cavity.

Figure 2A:
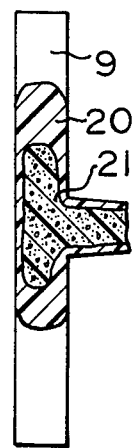
FIG. 2A to 2C are schematic sectional views illustrating a procedure of producing foamed moldings according to the present invention.
Figure 2B:
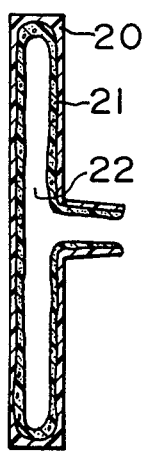
Figure 2C:
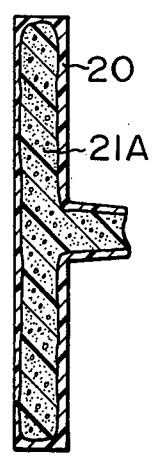

FIGS. 2A to 2C show steps of producing foamed moldings from both unfoamable and foamable resin materials. Molten unfoamable resin materials 20 are first injected into the mold cavity 9 and then molten foamable resin material 21 is injected in such condition that it is enclosed by the unfoamable resin materials 20 (see FIG. 2A). Thereafter, a body of gas under pressure is charged in the mold cavity 9 in the same manner as illustrated in FIG. 1 so that the unfoamable and foamable resin materials are forced against the surrounding walls of the mold cavity by the pressure of charged gas to be formed with a hollow portion 22 (see FIG. 2B). When the outer unfoamable resin materials 20 set at least at its surface layer, the gas is discharged out of the hollow portion so that the inner foamable resin materials 21 will expand in the hollow portion 22 toward its center to become an article consisting of the unfoamed outer layer 20 and a foamed core 21A surrounded by the outer layer 20.

Figure 3A:
FIGS. 3A to 3C are schematic sectional views illustrating another procedure of producing foamed moldings according to the present invention.
Figure 3B:
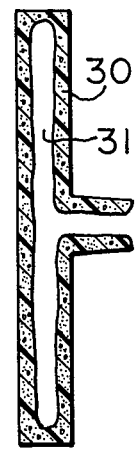
Figure 3C:
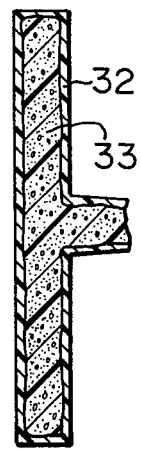

In another procedure shown in FIGS. 3A to 3C, foamable resin materials are molten and injected into the mold cavity 9 and expand therein to form a foamed body 30. Thereafter, a body of gas under pressure is charged in the mold cavity 9 in the same manner as aforementioned so that the resin materials will be forced against the surrounding walls of the mold cavity 9 to be formed with a hollow portion 31. When the gas is discharged out of the hollow portion 31 in such manner as aforementioned, the internal layer of the resin materials expands in the hollow portion 31 to form a foamed article consisting of an unfoamed outer layer 32 and a foamed core 33 as shown in FIGS. 3C.

Figure 4A:
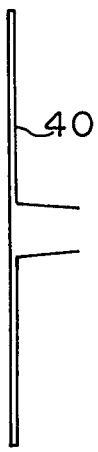
FIGS. 4A to 4D are schematic sectional views illustrating still another procedure of producing foamed moldings according to the present invention.
Figure 4B:
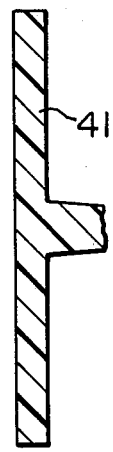
Figure 4C:
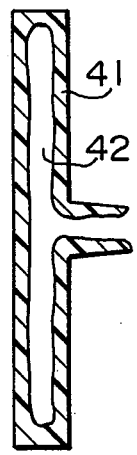
Figure 4D:
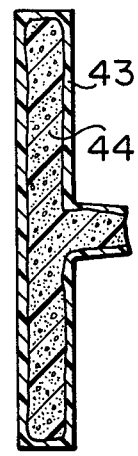

FIGS. 4A to 4D show still another procedure of producing a foamed article from foamable resin materials. In this process, a mold cavity 40 is adapted to be enlarged in volume by the injecting pressure of the resin materials and a gas under pressure. When the resin materials 41 are injected into the mold cavity 40, it is enlarged as shown in FIG. 4B. Thereafter, a body of gas under pressure is charged in the mold cavity in such manner as aforementioned to further enlarge the mold cavity to the desired volume and form a hollow portion 42 in the mass of resin material as shown in FIG. 4C. When the resin material sets at least at its outer surface layer, the charged gas is exhausted out of the hollow portion 42 so that the inner unset resin layer will expand to form a foamed article consisting of an unfoamed outer layer 43 and a foamed core 44 surrounded by said layer 43 as shown in FIG. 4D.

The term "synthetic resin material" as used herein means any thermoplastic resin generally used. Typical examples are polyethylene, polypropylene, polystyrene, styrene-acrylonitrile copolymer, styrene-acrylonitrile-butadiene copolymer, polyvinylchloride, nylon, polymethylmethacrylate and the like. The synthetic resin materials may be made foamable by addition of various foaming agents such as pentane, butane, hexane, propane, various Freons, Pneumatogen azodicarboxylic acid amide, dinitrosopentamethylenetetramine, gaseous nitrogen, air or the like.

The term "gas" described herein means any gas body gaseous under normal temperature and pressure, such as gaseous nitrogen, gaseous carbon dioxide and air. The gas is preferably inert such as gaseous nitrogen, carbon dioxide or the like.

The charging step of the gas for forming the hollow portion in the resin materials may be carried out at the same time as the resin materials are injected into the mold cavity. The gas is similarly charged in the mold cavity in a manner that it is enclosed by the resin materials.

The gas-charging device used can have a different charging mechanism than that shown in FIG. 1. The higher the pressure of the charged gas, the smoother is the surface of the foamed moldings. The thinner the thickness of the moldings, the higher is the charging pressure required. In general, 50 $Kg/cm^2$ or more is preferred.

By controlling the time when the gas is discharged out of the hollow portion of the resin materials, the thickness of the resin layer of the moldings may be varied as required. Further, by controlling the velocity when the gas is charged into the hollow portion of the resin materials, the moldings may have resin layers with uniform thickness.

By the pre-pressurization of the mold cavity it is possible to obtain foamed moldings which do not have swirl marks. When the pressure of gas pre-pressurizing the mold cavity is insufficient to prevent the expansion of the resin materials in the mold cavity, the resin materials will expand immediately on the injection into mold cavity. Even in such case, the foamed articles obtained according to the present invention may have smoother surfaces than those obtained according to the short-shot process although the swirl marks exist on their surfaces.

The adjustment of the foaming ratio may be effected by controlling the quantity of the foamable resin materials injected into the mold cavity. This quantity may be determined depending upon the desired foaming ratio.

EXAMPLE 1

The molding machine as shown in FIG. 1 was employed to produce foamed moldings. Polystyrene resin was added with 6% by weight of n-pentane as foaming agent and 0.2% by weight of azodicarboxylic acid amide as another foaming agent and 1% by weight of talc as nucleating agent. After the resin materials were plastified at 200° C., they were injected into a mold cavity having a cylindrical form with a length of 490 mm and a maximum diameter of 50 mm. The mold was made of aluminum.

The mold cavity was pre-pressurized with air under a pressure of 10 $Kg/cm^2$ prior to the injection and then the above-mentioned resin materials were injected into the mold cavity in an amount of 350 g. Subsequently, gaseous nitrogen at a pressure of 80 $Kg/cm^2$ was charged in the mold cavity in such manner that it is enclosed by said resin materials to form a hollow portion therein. After 5 seconds, the nozzle portion of the injection molding machine was separated from the mold assembly to discharge the gaseous nitrogen out of the hollow portion so as to form a foamed article consisting of an unfoamed surface layer which was smooth without swirl marks and a foamed core. The foamed article had a mean specific gravity of 0.57. When the gaseous nitrogen was discharged out of the hollow portion, the mold cavity was connected to a vacuum source through a suitable vent in the mold assembly. The gaseous nitrogen was pre-heated at 200° C. prior to the charge thereof.

EXAMPLE 2

Example 1 was repeated except that the resin materials were first injected in an amount of 250 g and then gaseous nitrogen at 80 $Kg/cm^2$ pressure was charged into the mold cavity through the gate of the mold assembly while 100 g of the resin materials were being injected thereinto. The resultant foamed article was similar to that obtained in the Example 1.

REFERENCE EXAMPLE 1

A foamed article was produced not according to the present invention in such manner that the mold cavity was not pre-pressurized and gaseous nitrogen was not charged in the mold cavity. The resultant foamed article had a rough surface and was inferior to that obtained according to the present invention.

EXAMPLE 3

Rubber-reinforced polystyrene resin was compounded with azodicarboxylic acid amide in an amount of 1.5% by weight as foaming agent and talc in an amount of 1% by weight as nucleating agent and molded in a manner similar to that in Example 1. The resultant foamed article consisted of a smooth surface in spite of swirl marks and a foamed core. The mean specific gravity was 0.57.

Example 4

ABS resin was molded in a manner similar to that in Example 1. The resultant foamed article consisted of a smooth surface layer without swirl marks and a foamed core.

EXAMPLE 5

A foamed article was produced in the procedure shown in FIGS. 2A to 2C. The same mold cavity was pre-pressurized with air at 10 Kg/cm$^2$ and filled with first resin materials which were 180 grams of polystyrene resins plastified at a temperature of 200° C. and subsequently second resin materials of the same foamable resin as in Example 1 in an amount of 200 g. A body of gaseous nitrogen was charged into the mold cavity through the gate of the mold assembly under a pressure of 80 Kg/cm$^2$ to form a hollow portion in the mass of resin materials in the mold cavity. After 5 seconds, the nozzle portion of the injection molding machine was separated from the mold assembly to discharge the gaseous nitrogen out of the hollow portion. The resultant foamed article consisted of a smooth surface without swirl marks and a foamed core and had a mean specific gravity of 0.62.

EXAMPLE 6

In a manner similar to that of Example 5, SAN resin as unfoamable resin material was first injected into the mold cavity in amount of 180 g and then the foamable ABS resin materials in Example 3 were injected into the same mold cavity in an amount of 200 g. The resultant foamed article consisted of a smooth surface without swirl marks and a foamed core.

What we claim is:
1. A method for injection molding of articles having an unexpanded outer layer and an expanded core contained therein; including the steps of
plastifying a foamable resin material without substantial expansion,
injecting a mass of said plastified and substantially unexpanded resin material into a closed mold cavity pre-pressurized with a first body of gas through an inlet in said mold cavity in an amount less than the volume of said mold cavity,
charging a second body of gas under pressure into said mold cavity through an inlet in said mold cavity to force said injected resin material against the walls of the mold cavity by the pressure of the charged second body of gas, whereby said gas is enclosed by said resin material and said second body of gas forms a hollow in the mass of said resin and
discharging said second body of gas from said mold cavity when said resin material within the mold cavity sets at least at its outer surface layer so as to permit the expansion of the remaining resin material, other than the set surface layer, to fill said hollow to thereby produce a molded article having a surface of an unexpanded layer of said resin and a core of foamed resin.
2. The method of claim 1, wherein said second body of gas is preheated prior to charging into the mold cavity.

* * * * *